(12) United States Patent
Cole et al.

(10) Patent No.: X6777
(45) Date of Patent: Sep. 28, 1831

(54) BARRELS, & C.

(76) Inventors: John Cole; Samuel Miller and Samuel Miller
John Cole of Washington County Ohio
Letters Patent.

The Schedule referred to in these Letters Patent and making part of the same containing a description in the words of the said John Cole and Samuel Miller themselves of their improvement in the machine for the manufacture of Barrels Tubs and other Coopers ware.

To all to whom these presents shall come. Be it known that we John Cole of the County of Washington State of Ohio, and Samuel Miller of the Town and County of Athens in the State aforesaid have made an improvement, being a machine for making Barrels, Tubs, Pails and other Coopers ware which is described as follows.

This machine consists of the following parts. 1st The frame. 2nd The part to shave staves. 3rd The part to shave hoops. 4th The part to joint staves. 5th to turn and dowel the heads. 6th the part for dressing the Barrel and cutting the crose. 7th part for facing the heading. 8th Cog wheels 9th Shaft Drum and Straps.

1st The frame is made by framing together two long timbers, 6 posts and four end pieces, having seven cross pieces placed at proper distances apart between the long timbers the whole forming a frame about 14 feet long. three feet more or less wide and about four feet high properly braced on the sides —— 2nd The part to shave staves. On the top of the frame near one end and across it are framed two pieces of scantling being about five feet long and of suitable breadth and thickness placed about 5 inches apart. Between these pieces are placed seven rollers with their gudgeons turning in boxes inside pieces. Near the centre of the frame is placed a roller having small iron points on its periphery. called a burred Roller, its axis projecting beyond the side piece and on its end a small cog wheel mashing into a large one on the main shaft below hereafter to be described. This burred roller is for forcing forward the stave to be shaved, over the burred roller is placed another roller, thicker in the middle than at its ends. with its gudgeons turning in Slides let into pieces, and operated on by springs secured to top of side pieces this roller with its slides and springs rises and falls to suit the thickness of the stave as it passes between it and the burred Roller to the knives should it be irregular in thickness, in front of the burred Roller is placed a smaller roller to assist in guiding the staves to the knives, the knives are placed over this small roller with their front edges nearly over its centre and the edge of the lower knife nearly on a level with the top of the burred roller: there are two knives which are placed the thickness of the stave apart and are secured to the side pieces of the frame by screw bolts which pass down through them. The other rollers are all plain and are for guiding the stave to the knives. The staves may be forced through the knives by a driver and lever attached to a crank shaft by a pitman and will force a stave through at every revolution of the crank 3d The part for shaving hoops, this is made similar to the one last described for shaving staves (except that the side pieces are placed one and a half inch apart instead of five and that the upper knife instead of being straight is formed semicircularly. Instead of the small cog wheel on the end of the burred roller, meshing into a large cog wheel, a crank handle turned may be used when necessary.

4th To joint the staves two posts 9 feet long and 9 inches square (more or less) are erected on two of the cross timbers of the frame and within 5 inches of one of the long timbers, at the distance of five feet from out to out with a piece 12 inches wide by five inches in thickness framed across the top. a gain or groove is cut out of the corner of each of the upright posts, in which a gate (hereafter described) slides up and down; the gate is made of scantling (about 4 by 5 inches) four feet long and four feet wide, the lower piece of which stands back about one inch from the front edge, in the centre of the gate and standing perpendicularly is an upright made of timber 3 by four inches. the knife is made of a piece of steel in the form of an oblique angle curved to suit the edge of the stave and secured on front of the gate; in the downward motion and when the jointing is performed. it
rubs against a piece of wood fastened to the long timber of the main frame.
the piece of wood is hollowed out to suit the shape of the back of the
stave. and on which the stave is placed for jointing: to the lower end
of the gate is attached one end of a pitman the other end of which
is attached to a crank shaft. having a cog wheel on its end mashing
into another cog wheel on the main shaft hereafter to be described.
5th To turn and dowel the heads - Two head blocks are erected
in the centre of the main frame.. on two of the cross pieces thereof
between these head blocks is placed a whirl 10 inches in length; 8 in.
diameter having one of its gudgeons extending through one of the head
blocks on which is secured a circular block 10 inches or more
diameter on the face of which are placed burrs to secure the head
to be turned. the head is secured against the circular block while
turning, by a screw passing through a moveable head block of the
same height as those first mentioned and placed opposite the cir-
cular block: a band passes round the above mentioned whirl to
the drum below, on the main shaft by which the circular block
is turned.. The dowelling is performed by having two dowel bitts with
whirl on one end placed at proper distance and turned by straps
and the drum below. 6th The part for dressing ends of barrel and
cutting cross - A shaft 4 feet or more in length with its gudgeons
running in head blocks, is placed directly over the main shaft of
the machine, and parallel with it; on the end of one of the gudgeons
is a wheel.. round which is a strap going round the drum on
the main shaft below to give motion to the shaft. Through this
shaft near each end and at the distance of two feet from out to
out, are four arms crossing at right angles each arm projecting
12 inches from the shaft and being 4 inches square. in the cen-
tre of each of these is a round or square hole about one and
a half inch diameter into which is put a slide having an in-
[illegible] on its end, through each arm is cut a square mortise par-
allel with the shaft, and at right angles with the hole in the arms into which mortise is put a wedge or key. The head block at one end of the shaft is hung with a hinge, so as to allow it to be thrown back out of the way in order to admit the barrel on the arms of the shaft.

7th <u>The part for facing the heading</u>. A wheel about 6 feet in diameter and of suitable thickness, is placed on the end of the main shaft opposite to that where the power is applied, on the face of this wheel is placed a knife, two feet or more in length extending from near the outer edge toward the centre. The head to be faced is cramped in a small frame about 3 feet 6 inches long and two feet wide by means of a screw operating on a moveable part of the frame; it is then slipped on a pivot in the centre of the wheel and supported by a platform below is pressed against the the wheel while the facing is performed 8th <u>Cog Wheels</u>. On the end of the gudgeons of each of the barred rollers is a small cog wheel, directly below these and meshing into them are large cog wheels. These are on the main shaft of the machine. Another cog wheel on the main shaft meshes into the cog wheel on the crank shaft working the gate of jointing machine.

9th <u>The drum and straps</u>. The main shaft is placed about the middle of the frame and parallel with it having its gudgeons turning in boxes on the top of the cross pieces of the frame; near the centre of the shaft is a large drum, around which pass the straps to the wheels before described. To this main shaft is applied the driving power which may be steam, water, animal or any other force.

Operation. The machine being put in motion, the stave to be shaved is placed on the rollers with its end between the barred and binding rollers, and by the motion of the machine is carried forward to the knives, forced through between them and shaved. The stave is next removed to the jointing part laid on the carved piece of timber or rest, and there by motion of the gate brought down upon it which at one or more strokes joints it. The hoops and heads are formed at the same time. These parts are then put together by hand and the barrel formed. It is then taken to the part of the machine for dressing the end and cutting the croze, which is done by placing
it over the arms of the shaft and driving up the wedges or
keys, which force out the slides with their points which se-
cure the barrel in its place while doing the work.

What we claim as our invention and which we wish
to secure by Letters Patent is the above described machine
for making Barrels, Tubs and other cooper's ware.

In testimony whereof we have hereunto subscribed our
names before two witnesses and made oath to the same this
sixth day of September 1831.

Witnesses
Almira Curtis
Walter Curtis

John Cole
Samuel Miller (1893 words)

(Granted September 29. 1831)